Dec. 17, 1935.   G. P. LUCKEY   2,024,799
METHOD OF AND APPARATUS FOR MEASURING TIME INTERVALS
Filed May 23, 1930
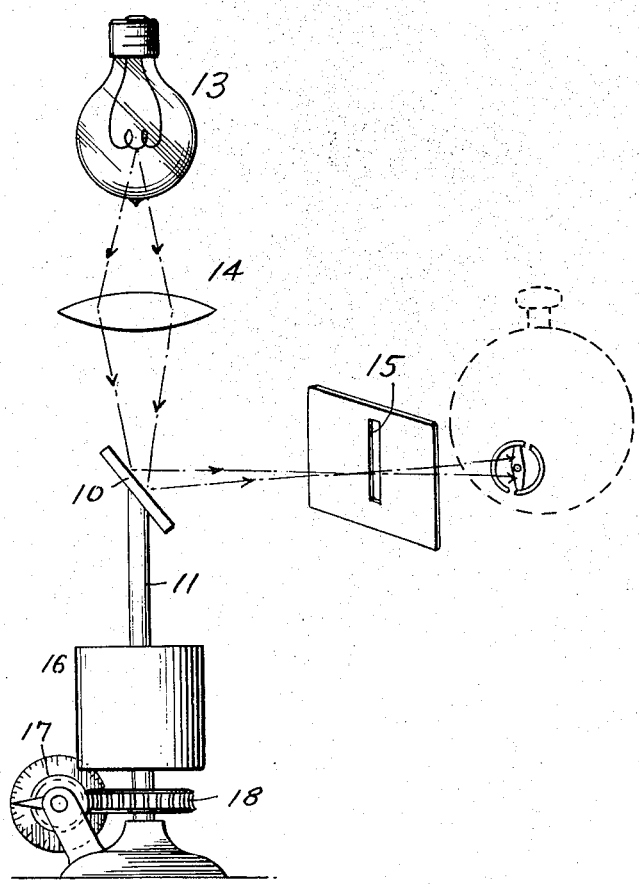
FIG. 1
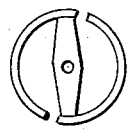
FIG. 2.
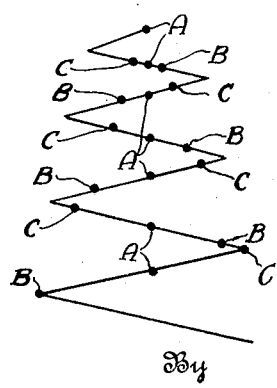
Inventor
Geo. P. Luckey,
By Chas. J. Williamson
Attorney Patented Dec. 17, 1935

2,024,799

UNITED STATES PATENT OFFICE 2,024,799

METHOD OF AND APPARATUS FOR MEASURING TIME INTERVALS

George P. Luckey, Lancaster, Pa., assignor to Hamilton Watch Company, Lancaster, Pa.

Application May 23, 1930, Serial No. 455,136

19 Claims. (Cl. 88—14)

In the checking of watches or other escapement time pieces it is customary to allow these to operate over a long period of time, for example twenty-four hours, to determine whether they are correctly timed. In case the timing can be checked to one second in twenty-four hours an error of plus or minus one second in 86,400 seconds is possible, which means that the error of a watch can, by timing it over a twenty-four hour period, be checked within one part in 86,400. To obtain accurate timing by this method it is necessary that the watch be placed under observation for long periods of time, and it is not possible to accurately determine any periodic change in the time that may occur during the time the watch is under observation.

The object of my invention is to obtain the same accuracy in timing over a very short period of time that is obtained over a long period of time by the conventional method.

The principle involved in my invention is that of a stroboscopic method involving the observation of the oscillating member such as a watch balance wheel, when illuminated by flashes of light occurring with extreme accuracy at constant intervals. In the following description the method is described in its application and in connection with the timing of a conventional watch escapement, consisting of a balance wheel and hairspring forming the oscillating system which are driven by a pallet and fork from an escape wheel. It is to be understood, however, that this method is not limited to its use to this particular case, but can be used for the very accurate timing of any oscillating or reciprocating or vibrating unit.

My invention consists in whatever is described by or is included within the terms or scope of the appended claims.

In the drawing:—

Fig. 1 is a diagrammatic view illustrating the essentials of apparatus embodying and for the practice of my invention for watch timing;

Fig. 2 is a diagram showing the cumulative effect of error.

A radius of the balance wheel, as for example the balance arm in oscillating moves from the position in which it would be at rest in case that it was not oscillating (hereinafter called the zero position) to a position where the hairspring is stressed to its maximum. When this position is reached the balance wheel comes to a stop and reversing its motion starts to move in the opposite direction. Up to the time the balance wheel reaches zero position the energy stored in the hairspring is supplied to the balance wheel, increasing its speed, until at the zero position there is no longer any tension in the hairspring and the balance wheel has attained its maximum speed. From this point on the balance wheel stores its kinetic energy as potential energy in the hairspring and the hairspring is stressed in the opposite direction. The balance wheel continues its motion until after all its energy of motion has been transferred into a stress in the hairspring at which point the balance wheel stops and again starts to move in the reverse direction. As long as sufficient energy is supplied to overcome energy lost through friction, the balance wheel will oscillate back and forth, and if properly designed the oscillations of the balance wheel will be very constant. The time for a complete oscillation of the balance wheel, that is, the time required to move from zero position to the point where the hairspring has received its maximum stress in one direction then through zero position to the point where the hairspring has received its maximum stress in the opposite direction and again back to its zero position is the period of oscillation of the balance wheel.

In watches the period of the balance wheel is usually two-fifths second. In case a watch has a two-fifths second period and is accurately timed the balance wheel will pass zero position every fifth second, and as it passes through this zero position it will have its maximum velocity. Thus, every fifth second the balance arm of the watch will be seen to be passing its zero position, first going in one direction and then in the opposite direction, and will be traveling with its maximum velocity.

Now, if a light were made to illuminate the balance wheel for a very short period of time, say one-three thousandth second, each time the balance arm is in its zero position the balance arm will be illuminated for such a short time that it will appear to remain stationary. This stationary image of the balance arm will be seen in one case when the balance arm is passing in one direction, the next time when the balance arm is passing in the opposite direction. From this it can be seen if the flashes of light are occurring exactly one-fifth second apart and if the balance arm is in its zero position every fifth second, that is if the balance arm has an accurate two-fifths second period, the images due to the balance arm passing in either direction will be superimposed and will be seen as one image.

If the flashes of light occur accurately every fifth second, but the period of the balance wheel is a trifle shorter than two-fifths second, and to start with the light is made to flash at the time the balance arm is in its zero position, the next time the light flashes the balance arm will have passed through its zero position and gone a trifle beyond. On its next return the balance arm will go twice as far beyond the zero position in the opposite direction, on the next passage three times as far, etc. Thus, for each succeeding flash of light the balance arm will be seen farther from its zero position, the images alternating right and left. If such a balance wheel is observed by means of a flashing light and the time of the light flash is adjusted to make the balance arm appear stationary at its zero position, first a single image of the balance arm will be observed, then as time passes the images of the balance arm moving in opposite directions will no longer be at the zero position and the observed effect will be a slight flicker in the image of the balance arm. This flicker will increase as the images of the balance arm move farther and farther from their zero position until finally two distinct images of the balance arm are observed on either side of the zero position. These two images during further observation will appear to move farther apart. From this it can be seen that if the period of the balance wheel is not the same as the period of the flashing light this fact can be quickly noticed.

This method of observing the difference in rates between the balance wheel and the flashing light is extremely sensitive. Assume, for example, that the balance wheel has an amplitude of 1½ turns, that is, that the balance arm moves ¾ turn to the right and ¾ turn to the left from the zero position. The velocity of the balance at its zero position will be such that it would make a turn, if the velocity would remain constant, in approximately $\frac{1}{4}$ second, assuming that by the above method a difference of 1/100 of one turn between the two images of the balance arm would be noticeable by the flicker produced, then this 1/100 of a turn difference would be produced when one image was 1/200 of a turn to the right and the other image 1/200 of a turn to the left of the zero position. The time necessary for the balance arm to move 1/200 of a turn past the zero position would be about 1/4800 of a second. From this it can be seen that as soon as the difference in time between the balance wheel and the flashing light amounts to 1/4800 second, a noticeable flicker of the balance arm will be observable. In other words, if the two images of the balance arm traveling in opposite directions are superimposed, then a change in the rate of the balance wheel with respect to the flashing of the light of 1/4800 of a second will be observable. If, after the superposition of the balance arm images, a minute is required for the flicker to become observable then the balance wheel is gaining at the rate of 1/4800 second a minute or $\frac{1}{80}$ seconds in twenty-four hours. Thus, in one minute greater accuracy can be obtained by this method of timing than can be obtained in twenty-four hours by the conventional method.

The same effect in the changing of the position of the balance arm image would be observable if the watch were running slower than the flashing light. This is made more apparent in Fig. 2, which shows a balance wheel and arm and also a chart showing the different positions of the balance arm at different times. Point A on this chart shows the position of the balance arm each time it is illuminated by a flashing light if the flashing light has half the period of the balance. Point B shows the position of the balance arm image in successive stages if the period of the balance arm is greater than the flashing light, and the points designated C show the position of the balance arm if the half period of the balance is less than the period of the flashing light.

To obtain the illumination of the balance arm it is desirable to have a flashing light in which the time at which the light flashes can be readily changed to make the light flash sooner or later without changing the time between the light flashes. In this way the light can be made to illuminate the balance arm in any position and can be adjusted so that the balance arm is illuminated when at its zero position. Then, if the half period of the balance arm and the period of the light are not the same the time at which the light flashes can at a later time be slightly changed until the balance arm is again in its zero position. If the balance arm is faster than the flashing light the light can be made to flash at an earlier time, and if it is slower than the flashing light the light can be made to flash later. Then the amount it has been necessary to change the time of the light flashes to again bring the balance arm to its zero position after a certain elapsed time will give an exact measurement of the time change between the two and the period of the balance wheel. Whether it it necessary to speed up or slow down the time at which the light flash occurs will show whether the watch is running fast or slow.

Although there are many methods and means whereby this may be accomplished the following has proved to be satisfactory. A mirror, 10, is mounted upon a shaft 11, rotating at 300 R. P. M., thus making a revolution every fifth second. A light source, 13, and lens, 14, are placed above the rotating shaft directed toward the mirror so that the light is reflected and the image of the light, as the mirror is rotated is thrown around a circle centered in the shaft and in a plane at right angles to it. In case a slit, 15, is placed on the circumference of this circle and the light is allowed to shine through it into the watch, the light will be thrown through this slit once during each revolution of the rotating shaft. If the slit is $\frac{1}{16}$" wide and the circumference of the circle on which the image of the light source is cast is 60" then the light will traverse the circumference every fifth second and will shine through the slit once each fifth second for a period of 1/3000 second. If the balance wheel is placed behind this slit it will be illuminated during this period of time. Now, if the housing or mounting of motor, 16, for rotating shaft, 11, is rotated, or if the slit is moved around the rotating shaft, the light can be made to flash at a time sooner or later depending upon the amount the mounting or the slit are moved. However, as soon as this movement has stopped the time between the flashes will be exactly one-fifth second apart. In case the mounting, 16, of the rotating shaft or the slit is moved one complete turn the time at which the light flashed will have been changed one-fifth second. If the housing or slit is moved 1/600 turn the time at which the flashes occur will have been changed by 1/3000 second. Now, assuming that the watch is observed by the flashing light, and the phase of the flashing light is adjusted by moving the rotor mounting or the slit until the balance arm appears in its zero position without flicker, then if after observing the balance arm for one minute it is found that the rotor mounting has to be moved in the direction of rotation 1/600 turn to bring the images of the balance arm together again, this will show that in one minute the watch has gained 1/3000 of a second, or it is gaining at the rate of less than ½ second a day. A reverse rotation of the rotor mounting of the same amount to superimpose the images would show a loss in the rate of the watch of the same amount.

There are many possible ways of obtaining a shaft which will rotate with sufficient accuracy at 300 R. P. M. The most desirable method would be to use a synchronous motor, 16, driven by an alternating current which had an extremely constant frequency, such as could be obtained from a quartz crystal oscillator or a vibrating tuning fork, controlled by a master clock. In case a synchronous motor is used, the housing of the motor can be rotated to get the necessary phase shift in the light flashes. Another method of obtaining such a rotating shaft would be to use a motor driven at approximately 300 R. P. M. and having upon it, free to move, a rotor carrying the mirror, this rotor being controlled to the proper speed at very short intervals by means of electro magnetic impulses from a master clock. The rotor mounting can as shown in Fig. 1, be rotated by means of a worm, 17, which can be thrown in and out of mesh with a worm wheel, 18, fastened to the rotor mounting. This will enable a quick adjustment of the phase of the light flashes to bring the balance arm to its zero position and then a fine adjustment by means of the worm gear to observe changes in time, such fine adjustment being by hand. A scale or index associated with the worm gear, is provided to measure and show the degree of rotation of the mounting required by the error of the balance, and give data to correct the error.

It will be seen that there are several positions of the balance arm at which the images of the balance arm going in the two directions will appear to be superimposed if the flashing light has the proper phase. The balance arms will appear to be superimposed in the zero position, first when the light flashes at the time the balance arms are in their zero position, second when it flashes after they have made a half turn to the right or left of their zero position, and third, after they have made a complete turn to the right or left of their zero position. They will appear to be superimposed at right angles to the zero position at a one-quarter turn and three-quarter turn. Anyone of these positions can be used for timing, however, it is desirable to take the zero position as at this position the balance arm is moving at its highest velocity and the sensitivity of this method of timing is the greatest. This position can be easily determined either by observing the sensitivity of the device, that is, noticing how much the rotor mounting must be moved to obtain a noticeable fluttering of the balance arm, or by noting the relative positions of the rotor mounting when different images are brought into superposition. Owing to the different velocity of the balance wheel in different position of its path the position of the rotor mounting when the two images of the balance arm are superimposed will not be equally spaced, but the points of superposition will be closer to each other in the neighborhood of the zero position. By using the zero position of the balance arm as the position at which to obtain the superposition of the images seen by the flashing light the maximum sensitivity of the device can be obtained. In case it were desirable to make this observation of the zero position more readily obtainable, this could be done by darkening one-half of the balance arm from the center out to the circumference. In an oscillating member in which points do not repeat themselves, such as a vibrating reed, this multiplicity of images would not occur.

In the foregoing description the arm of the balance wheel has been described as the point of observation. This has been done simply because in the present watches the balance arm offers a ready point for observation without making any change in the present watch mechanism. However, any point on the balance wheel could be used for observation, and it might be possible to obtain more accurate results by placing a special point on the balance wheel which would be used solely for observations. Such a point might be a minute concave mirror on the head of a screw which would reflect the light on a screen.

It is desirable in timing a watch to observe the time of the watch in different positions. This can be done very readily by means of this flashing light as the watch can be placed in any desired position and by means of mirrors the light can be thrown on the balance arm. Using this system it is not necessary to have the watch under constant observation. The flashing light can be set so that the two images are seen in their zero position, then leaving the light at the same phase the watch can be observed at some later time and the amount the phase must be shifted to bring it to zero position shows what the watch has gained or lost in that time. This procedure might also prove of value in determining the effect of various influences, such as vibration, on the watch as the watch can be taken from the position where it is illuminated and moved about during the time between observations.

It will be seen from the above description that this method of timing is independent of the amount of motion taken by the balance wheel or the amplitude of vibration of the oscillating member under observation, as the time measured is the time between the passages of the vibrating member through its zero position and is thus independent of the amount it swings on either side of zero position. The only effect of an increased or decreased amplitude of vibration will be to cause a slight increase or decrease in the sensitivity of this system. Such increase or decrease will make relatively little difference in the use of this system for timing purposes, as the sensitivity possible to obtain with it is very much greater than there is any need for in the ordinary requirements of timing watches, clocks, or other time pieces. By suitably designing the point under observation on the oscillating member, there is possibility of very greatly increasing the sensitivity of this system in case it should be desired, the limiting sensitivity in any case being the accuracy with which it is possible to obtain correctly timed light flashes.

What I claim is:—

1. A method of timing the period of a to and fro moving body which includes the acts of observing it with an accurately timed light flash, the phase of which can be varied shifting the phase of the light flash so that the images seen of the member when moving in opposite directions are superimposed and again superimposed after a given length of time, and using the phase shift of the flashing light to complete the second superposition to measure the change in time of the oscillating member and to show whether it gained or lost relative to the time of the flashing light.

2. A method of timing the period of a to and fro moving body which includes the acts of producing accurately timed light flashes at constant frequency directed to such body at intervals in the movement of the body in opposite directions under conditions when images of the body may be seen superimposed, at different points in the path of movement of the body by shifting the phase of the light flashes and measuring the change in time of the oscillating body by such phase shift at the end of a given period of time.

3. An instrument for timing the period of a to and fro moving body which comprises means for periodically flashing a light at constant frequency for a given period of time concurrently with the motion of the body whose period is to be timed and at a point when the motion takes place in opposite directions, means for changing the phase of the light flashes while maintaining the original frequency of the light and means to measure the amount of the phase change at the end of such time period.

4. An instrument for observing successive phases of a reversing periodic motion comprising means for periodically flashing a light at constant frequency for a given period of time concurrently with the motion whose phases are to be observed, means for changing the phase of the light flashes with reference to a point of reversal of direction of the periodic motion while maintaining the original frequency of the light and means to measure the amount of the phase change at the end of such time period.

5. An instrument for timing a watch by reference to the balance wheel thereof which comprises, means for periodically flashing at constant frequency a light upon the balance wheel when its arm is in zero position in its movement in opposite directions and time measuring means comprising means to change the phase of the light flashes and to measure the amount of the phase change at the end of a given period of time.

6. A method of timing watches and the like, having an armed balance wheel which includes the acts of causing accurately timed light flashes at constant frequency to shine upon the balance wheel at selected points in the oscillation of the wheel, varying the phase of the light flashes and measuring the rate of the balance wheel by the phase shift at the end of a given period of time.

7. Apparatus for the study of a body in motion comprising means for rendering such body momentarily observable at constant time intervals whose phase is shiftable relative to that of the body in motion, means to cause such phase shift for changing the time for making the observations and means for measuring such time change at the end of a given time period while maintaining the original constant time intervals of said means for rendering the body momentarily observable.

8. Apparatus as in claim 7 by which a series of momentary observations are obtainable and having means to start a series earlier or later and the time measurement is of the difference in series starting time.

9. Apparatus for the study of a body in motion comprising means for affording a series of momentary observations with a predetermined constant time interval between observations, means for shifting the instant of observation for a series, and means for measuring the amount of shift between observations.

10. Apparatus as in claim 9 in which the instant of observation may be shifted any amount up to the time interval between observations.

11. Apparatus for the study of a moving body comprising means for making momentary observations of a portion of the body at successive predetermined constant time intervals, means for changing the time of occurrence of such observations without changing the time intervals of observations and means for measuring the change necessary to alter the time of occurrence.

12. Apparatus for the study of a periodically moving body comprising means for affording a series of momentary observations thereof with a predetermined constant time interval between observations, means for shifting the instant of observations for any series to render the portion of the periodically moving body under observation visible for a short space of time at a selected position in its path of motion, and means for measuring the amount of shift between observations.

13. Apparatus for timing the period of a to and fro moving body which comprises means for throwing upon such body while in motion light flashes at constant frequency, means for changing the phase of the light flashes while maintaining the original frequency of the light flashes, and means to measure after a set period of time the phase change of the light flashes required to make the flashes again strike the original flash-receiving point of the body.

14. A method for timing a periodically moving body which includes the acts of obtaining a series of momentary observations of a portion of said body while in motion with a predetermined constant time interval between observations, changing the instant of observation for a series so that the portion of the moving body under observation will appear stationary for a short space of time at a selected position in its path of motion, repeating such acts at a later time, with another series of observations and determining from the change of phase between series of observations the amount of time required to shift the instant of observation between two series of observations.

15. A method of timing the period of a to and fro moving body which includes the acts of observing it with a constant period light flash, the phase of which can be varied, shifting the phase of the light flash so that the images seen of the body when moving in opposite directions are superimposed and again superimposed after a given length of time, and using the phase shift of the flashing light to complete the second superimposition to measure the change in time of the oscillating body and to show whether it gained or lost relative to the time of the flashing light.

16. Apparatus for determining the period of a body movable about a center of motion, such as a body forming a member of the control system of a time piece, which comprises means for rendering visible at the end of successive intervals set points in the path of such body, said means including a device movable at a constant rate and constituting a standard for comparison with said body to be timed to show whether its rate corresponds with or varies from the rate of said body, said device movable at a constant rate having as a part thereof means to measure the magnitude of any such variation in terms of time, and means to move said device at a constant rate.

17. A method of checking a to and fro moving member to determine its rate which includes the acts of causing accurately timed light flashes at constant frequency to shine upon such member at selected points in its path of motion, varying the phase of the light flashes and measuring the rate of the moving member by the phase shift at the end of a given period of time.

18. A method as in claim 17 in which the light flashes occur substantially twice the period of the to and fro moving member.

19. Apparatus for determining the period of a body movable about a center of motion and which forms a member of the control system of a time piece, which comprises means for producing accurately timed light flashes at constant frequency, including a synchronous motor, a rotatable support for said motor shiftable to change the phase of the light flashes, and indicating means including a member moving with the motor support to show the extent of movement of the motor support in making the phase shift.

GEORGE P. LUCKEY.